US009041918B2

(12) United States Patent
Eisele et al.

(10) Patent No.: US 9,041,918 B2
(45) Date of Patent: May 26, 2015

(54) MEASURING APPARATUS AND REFERENCING METHOD FOR A DIGITAL LASER DISTANCE METER, AND LASER DISTANCE METER

(71) Applicant: Robert Bosch GmbH, Stuttgart (DE)

(72) Inventors: Andreas Eisele, Leinfelden-Echterdingen (DE); Bernd Schmidtke, Leonberg (DE); Reiner Schnitzer, Reutlingen (DE); Oliver Wolst, Singapore (SG)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/108,751

(22) Filed: Dec. 17, 2013

(65) Prior Publication Data

US 2014/0168632 A1 Jun. 19, 2014

(30) Foreign Application Priority Data

Dec. 19, 2012 (DE) ......................... 10 2012 223 689

(51) Int. Cl.

| | |
|---|---|
| ***G01C 3/08*** | (2006.01) |
| ***G01S 17/10*** | (2006.01) |
| ***G01S 17/08*** | (2006.01) |
| ***G01S 7/481*** | (2006.01) |
| ***G01S 7/497*** | (2006.01) |

(52) U.S. Cl.

CPC ................ *G01S 17/10* (2013.01); *G01S 17/08* (2013.01); *G01S 7/481* (2013.01); *G01S 7/497* (2013.01)

(58) Field of Classification Search

CPC ......... G01S 17/10; G01S 7/497; G01S 17/89; G01S 7/487; G01C 3/08

USPC .............. 356/3.01, 4.01, 4.07, 5.041, 5.09, 9, 356/625

See application file for complete search history.

(56) References Cited

U.S. PATENT DOCUMENTS

| | | | | |
|---|---|---|---|---|
| 4,001,886 | A * | 1/1977 | Hofste op Bruinink | 360/75 |
| 6,631,486 | B1 * | 10/2003 | Komatsu et al. | 714/724 |
| 8,184,507 | B1 * | 5/2012 | Hirano et al. | 369/13.33 |
| 2003/0020010 | A1 * | 1/2003 | Cornish et al. | 250/287 |
| 2007/0035007 | A1 * | 2/2007 | Dietz et al. | 257/700 |
| 2007/0182949 | A1 | 8/2007 | Niclass | |
| 2008/0284564 | A1 * | 11/2008 | Leitch | 340/5.61 |
| 2011/0066030 | A1 * | 3/2011 | Yao | 600/438 |
| 2012/0018641 | A1 * | 1/2012 | Watanabe et al. | 250/354.1 |
| 2012/0243562 | A1 * | 9/2012 | Maron et al. | 372/9 |
| 2013/0099101 | A1 * | 4/2013 | Campbell | 250/208.2 |

FOREIGN PATENT DOCUMENTS

| | | | | |
|---|---|---|---|---|
| CH | EP2469301 | A1 * | 6/2012 | G01S 7/486 |
| DE | 3429062 | A1 | 2/1986 | |

* cited by examiner

*Primary Examiner* — Isam Alsomiri
*Assistant Examiner* — Samantha K Abraham
(74) *Attorney, Agent, or Firm* — Maginot, Moore & Beck LLP

(57) ABSTRACT

A handheld distance measuring instrument includes a first emission device, a first reception device and a second reception device. The first emission device is configured to emit an optical measurement radiation onto a target object. The first reception device is configured to detect the radiation returning from the target object. The second reception device is configured in order to detect a reference radiation internal to the instrument. The reception devices respectively include a first detector unit, a second detector unit, a first time measurement unit, and a second time measurement unit. The first time measurement unit is configured to be connected selectively to the first detector unit and to the second detector unit. The second time measurement unit is configured to be connected selectively to the first detector unit and to the second detector unit.

20 Claims, 6 Drawing Sheets

1 6 43 27 49 48 41 25 37 39 5 3 21 51 17 15 50 13 11 9 20 29 31 16 33 35 47 59

1
6
5
3
9
11
13
15
16
17
18
19
20
21
22
23
25
27
29
31
33
35
37
39
41
43
47
48
49
50
51
52
53
55
57
59

1
6
43
61
5
17
15
11
35
33
51
39
21
47
59
27
49
48
13
16
31
3
50
29
41
37
9
20
25

1
6
6'
15
17
11
35
51
33
47
5
39
43
45
27
16
13
21
59
31
50
29
3
37
41
9
25
20

MEASURING APPARATUS AND REFERENCING METHOD FOR A DIGITAL LASER DISTANCE METER, AND LASER DISTANCE METER

This application claims priority under 35 U.S.C. §119 to patent application no. DE 10 2012 223 689.9, filed on Dec. 19, 2012 in Germany, the disclosure of which is incorporated herein by reference in its entirety.

BACKGROUND

Optical distance measuring instruments which can determine a distance between the distance measuring instrument and a target object are known. To this end, the distance measuring instruments emit a light beam in the direction of the target object and detect light reflected by the object and returning in the direction of the distance measuring instrument.

The distance may be determined by means of a time-of-flight method. The measurement may in this case be carried out in the time domain or in the frequency domain. In the case of a time-domain measurement, for example, a short laser pulse may be emitted at a time $t_{start}$ to the target object, and scattered or reflected there. A part of this measurement radiation travels, for example, via a reception optical unit to the optical receiver and reaches the latter at a time $t_{stop}$. The distance d of the target object is calculated from the measured time of flight ($t_{stop}$ minus $t_{start}$) and the velocity of light $c_0$.

In order to improve the measurement accuracy, background radiation may be taken into account. To this end, a reference measurement path internal to the instrument, with a known distance between the light source and the reception apparatus, may be used. For example, such referencing is known from US 2007/0 182 949.

Even when taking the background radiation into account, the measurement accuracy may be reduced, for example, by systematic measurement errors. The systematic measurement errors may, for example, be caused by temperature-dependent signal times of flight, in particular within the evaluation circuit integrated in the distance measuring instrument.

SUMMARY

There may therefore be a need for a measuring apparatus and a method which make it possible to improve the measurement accuracy and reliability of a distance measurement.

This need can be met by the subject-matter of the present disclosure according to the independent claims. Advantageous embodiments of the present disclosure are described in the dependent claims.

Features, details and possible advantages of an apparatus according to embodiments of the disclosure will be discussed in detail below.

A first aspect of the disclosure provides a measuring apparatus for optical distance measurement. The measuring apparatus comprises a first emission device, a first reception device and a second reception device. The first emission device is configured in order to emit an optical measurement radiation onto a target object. The first reception device is configured in order to detect the radiation returning from the target object. The second reception device is configured in order to detect a reference radiation internal to the apparatus. The first reception device comprises a first detector unit and a first time measurement unit. The second reception device comprises a second detector unit and a second time measurement unit. The first time measurement unit can be connected selectively to the first detector unit and to the second detector unit. The second time measurement unit can be connected selectively to the first detector unit and to the second detector unit.

In other words, the concept of the present disclosure is based on using two identical integrated circuits, and in particular two identical time measurement units and two identical detector units, which can be connected together crosswise. In this way, the time measurement units of the reception circuits can be interchanged with one another both in the distance measurement and in the reference measurement. Measurement errors can thereby be compensated for reliably, for example by forming average values or differences between the times of flight determined in this way.

In particular, time-of-flight differences which are caused by a temperature drift within a laser diode of the measuring instrument can be compensated for effectively and economically by the configuration, according to the disclosure, of the measuring instrument. Furthermore, time-of-flight differences occurring within the integrated circuits, i.e. within the reception circuits, can be compensated for with the aid of the measuring instrument. Furthermore, the costs can be kept relatively low by using identical circuits for the first and second reception devices.

The measuring apparatus may in this case be a digital, or optoelectronic, handheld distance measuring instrument. In particular, the measuring apparatus may be configured as an SPAD-based laser distance meter (SPAD=Single Photon Avalanche Diode). The measuring apparatus may be configured in order to determine a distance to a target object, also referred to as a target, which lies at a distance of a few cm to a few hundreds of m from the measuring apparatus. The measurement method of the measuring apparatus may in this case be based on high-frequency laser modulation and light time-of-flight analysis.

The measuring apparatus comprises a first emission device. The emission device may in this case control the signal of a light source, for example an LED, a laser or a laser diode. The measuring apparatus furthermore comprises a first and a second reception device. The reception devices are configured in order to detect the measurement radiation reflected by the target object, or by a reference target having a known distance, and in order to determine a time of flight of the respective radiation. The reception devices and the emission device may be configured as part of an integrated circuit, particularly in the form of an ASIC (ASIC=Application-Specific Integrated Circuit). In this case, the first and second reception devices may be provided on two separate ASICs or on the same ASIC. Advantageously, the first reception device is configured as part of a first ASIC and the second reception device is configured as part of a second ASIC. The first and second ASICs may in this case be configured identically. In the case of an identical configuration of the ASICs, costs can be reduced since production of ASICs with modified functionalities is obviated. In particular, when using two separate, in particular identical ASICs, the ASICs may be provided with separate housings which ensure good optical isolation between the measurement radiation and the reference radiation.

The reception devices respectively comprise detector units and time measurement units. In this case, each reception device may comprise at least two, and in particular a plurality of, time measurement units and detector units. Preferably, each time measurement unit is assigned at least one detector unit.

The detector units may deliver an output signal which is sent to assigned time measurement unit. The output signal may in this case correspond to an electrical pulse, which is induced by absorption of a photon and the pulse edge of which correlates with the time of the detection of the photon. The detector units may preferably be configured with a plurality of optionally interconnectable photosensitive elements.

The photosensitive elements of the detector units may, for example, be modulated charge-coupled devices (CCDs), complementary metal oxide semiconductor pixels (CMOS pixels), avalanche photodiodes (APDs) or positive-intrinsic-negative diodes (PIN diodes).

Preferably, the detector units may be based on single photon avalanche diodes (SPADs) as photosensitive elements. The time measurement may in this case be carried out with the aid of clocked counters, the clock signals of which are generated by a frequency generator. The frequency generator may be supplied by an oscillator. Simultaneously with this, the emission or measurement radiation may be modulated correspondingly by means of the emission device. The high-frequency generator and the oscillator may in this case be configured as parts of the measuring instrument.

The time measurement units are configured, on the basis of the output signal of the respectively assigned detector unit, in order to determine a time of flight of the radiation detected by the detector unit. In this case, for example, the signals may be sent to the first or second detector unit by means of a switch of each time measurement unit. To this end, inputs and outputs of the time measurement units and of the detector units may be connected commutatively to one another by means of one or more switches.

A distance measurement with the aid of the measuring instrument may be carried out in the frequency domain, or according to the phase time-of-flight method. In this case, the optical radiation of a light source is modulated in its intensity, for example sinusoidally. This modulated radiation is emitted onto the target object and scattered or reflected there. A part of the reflected radiation travels, for example via reception optics, to the first reception apparatus. As a function of a distance of the target object, the received sinusoidally intensity-modulated radiation has a phase shift with respect to the emitted sinusoidally intensity-modulated signal. The distance to the target object can be calculated from the phase difference between the received and emitted signals, the known modulation frequency and the velocity of light.

The time of flight or phase difference of the measurement radiation may for example be determined sequentially, first by means of the first time measurement unit and subsequently by means of the second time measurement unit. Likewise, the determination of the time of flight of the reference radiation is carried out sequentially, first by means of the first time measurement unit and subsequently by means of the second time measurement unit. The times of flight may subsequently be compared with one another, and average values may optionally be formed.

According to one exemplary embodiment of the disclosure, the measuring apparatus comprises an evaluation unit, which is configured in order to determine a first time of flight $T_A$ by using the first detector unit and the first time measurement unit. This measurement is denoted by A. The evaluation unit is furthermore configured in order to determine a second time of flight $T_B$ by using the second detector unit and the second time measurement unit. This measurement is denoted by B.

The evaluation unit may furthermore be configured in order to determine a third time of flight $T_C$ by using the first detector unit and the second time measurement unit. This measurement is denoted by C. Lastly, the evaluation unit may be configured in order to determine a fourth time of flight $T_D$ by using the second detector unit and the first time measurement unit. This measurement is denoted by D.

The determination of the first and second times of flight may be carried out simultaneously, i.e. in parallel.

Furthermore, the determination of the third and fourth times of flight may likewise be carried out simultaneously.

The distance measurement process can be accelerated by simultaneous determination of the individual times of flight.

According to another exemplary embodiment of the disclosure, the evaluation unit is furthermore configured in order to determine a time-of-flight difference ΔT or an average time-of-flight value by difference formation or average value formation between the times of flight, respectively. The evaluation unit is configured in order to compensate for the time-of-flight errors of the measuring apparatus. Compensation may, for example, in this case comprise calculating out the time-of-flight difference during subsequent distance measurements and/or readjustment of the integrated circuits.

For example, a time-of-flight drift of a laser diode which emits the measurement and reference radiation may be compensated for by the following difference formation:

$$\Delta T = \frac{T_A - T_B + T_C - T_D}{2}.$$

Furthermore, drifts between a first time measurement unit (or a first frequency generator) which is assigned to a first ASIC, and a second time measurement unit (or a second frequency generator) which is assigned to a second ASIC, may be compensated for by this difference formation. This is particularly advantageous since the circuits may operate with a higher frequency in comparison with the frequency generator. In this case, the two time measurement units may also be driven by a single frequency generator.

Crosstalk of the active first emission device, also referred to as a laser driver, to the time measurement units or also a drift in the time measurement units may generally be compensated for by the following difference formation:

$$\Delta T = T_A - T_D.$$

The measurements A and D are in this case carried out as described above by using the first time measurement unit. By the difference formation of the first time of flight $T_A$ and the fourth time of flight $T_D$, it is also possible to compensate for the time-of-flight drifts of a laser diode, as well as time-of-flight drifts between the frequency generators.

By the difference formation:

$$\Delta T = T_A - T_B,$$

time-of-flight drifts of the laser diode and drifts between crossed lines of the reception devices can furthermore be compensated for.

According to another exemplary embodiment of the disclosure, the measuring apparatus comprises a second emission device and a laser driver switch. The laser driver switch is configured in order to connect a laser selectively to the first emission device and the second emission device. The second emission device may be arranged together with the second evaluation device on a separate second ASIC. For example, during the measurements A and D with the use of the first time measurement unit, the laser may be operated by means of the second emission device in such a way that crosstalk is avoided. The laser driver switch may in this case be arranged in the driver path between the SPAD and the laser. Alternatively, the laser driver switch may be integrated into the SPAD.

According to another exemplary embodiment of the disclosure, the measuring apparatus furthermore comprises at least a first and a second multiplexer, or switch. The first multiplexer is configured in order to connect the first time measurement unit selectively to the first detector unit and to the second detector unit, and the second multiplexer is configured in order to connect the second time measurement unit selectively to the first detector unit and to the second detector unit. With the aid of the multiplexers, it is possible to compensate for time-of-flight differences without additional inputs and outputs on the reception apparatuses. This is advantageous in particular when, for example, two separate ASICs are used.

According to another embodiment of the disclosure, the measuring apparatus comprises an oscillator and a high-frequency synchronization line. The high-frequency synchronization line in this case connects the first time measurement unit to the oscillator. Furthermore, the high-frequency synchronization line connects the second time measurement unit likewise to the oscillator. In this way, the first and second time measurement units can be tuned to one another, i.e. synchronized, in such a way that the time of flight determined by the first time measurement unit can be compared with the time of flight determined by the second time measurement unit. In particular, the high-frequency synchronization line may connect the oscillator to the time measurement units via one or more high-frequency generators. The high-frequency generator may in this case generate a frequency which is, for example, higher by a factor of 100 from a comparatively low frequency of the oscillator.

The high-frequency synchronization of the time measurement units may for example be advantageous for compensation for a jitter, which will be described below. Furthermore, the high-frequency synchronization may be advantageous when positioning the first and second reception devices on a common ASIC.

Alternatively, the synchronization may be carried out with the aid of a low-frequency synchronization line. In this case, the oscillator may be connected directly to the time measurement units. Low-frequency synchronization could be advantageous when using two separate ASICs.

According to another exemplary embodiment of the disclosure, besides a first and a second emission device, the measuring apparatus also comprises two separate lasers, or laser diodes. The first emission device is configured in order to operate the first laser selectively when the first time measurement unit is connected to the first detector unit or to the second detector unit. Furthermore, the second emission device is configured in order to operate the second laser selectively when the second time measurement unit is connected to the first detector unit or to the second detector unit. In this case, a laser driver switch may be obviated. The first laser, or the first laser diode, is in this case arranged at the same distance from the target object and from the reference object as the second laser, or the second laser diode. The measurements of the first, second, third and fourth times of flight are carried out sequentially in this exemplary embodiment.

According to another exemplary embodiment of the disclosure, the measuring apparatus comprises a slider. The slider is in this case configured in order to permit the above-described measurements A, B, C and D in a first position. The slider is furthermore configured, in a second position, to direct the reference radiation internal to the apparatus to the first reception device, and in order to direct the radiation returning from the target object to the second reception device. The measurements carried out in this case may correspondingly be denoted by A', B', C' and D'.

In other words, the optical reception paths are interchanged by the slider while preserving the time-of-flight differences in the second position with respect to the reception devices, or with respect to the detector units. The slider may in this case be a mechanical element.

By virtue of the additional combination possibilities of measurements, made possible by the slider, time-of-flight drifts between the crossed reception paths, or lines, may for example be compensated for with the aid of the following calculation. Furthermore, all further drifts between the detector units, which for example occur in the detector units themselves, may also be compensated for by the following calculation:

$$\Delta T = \frac{1}{2}\left(\frac{T_A - T_B + T_C - T_D}{2} - \frac{T_{A'} - T_{B'} + T_{C'} - T_{D'}}{2}\right).$$

According to a second aspect of the disclosure, a method is provided for compensating for measurement errors of a measuring apparatus as described above. The method comprises the following steps: determining a first time of flight $T_A$ of radiation returning from a target object by using a first detector unit and a first time measurement unit; determining a second time of flight $T_B$ of reference radiation internal to the apparatus by using a second detector unit and a second time measurement unit; determining a third time of flight $T_C$ of the radiation returning from the target object by using the first detector unit and the second time measurement unit; determining a fourth time of flight $T_D$ of the reference radiation internal to the apparatus by using the second detector unit and the first time measurement unit; forming differences, or average values, between the times of flight in order to compensate for time-of-flight errors by means of an evaluation unit.

Other features and advantages of the present disclosure will become apparent to the person skilled in the art from the following description of exemplary embodiments, although these are not to be interpreted as restricting the disclosure, with reference to the appended drawings.

DETAILED DESCRIPTION

Figure 1:
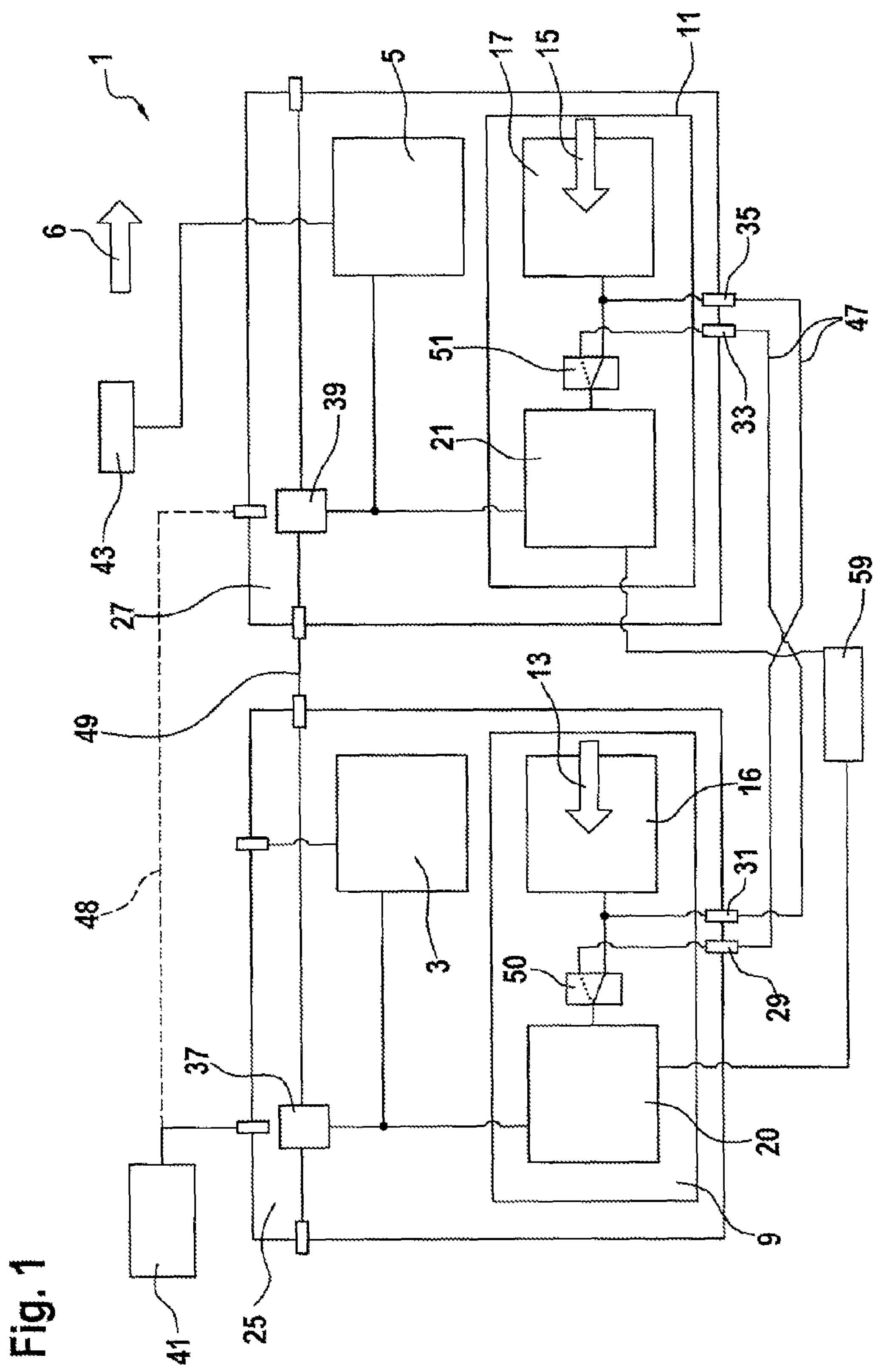
FIG. 1 shows a block diagram of a measuring apparatus according to a first exemplary embodiment of the disclosure.

All the figures are merely schematic representations of apparatuses according to the disclosure, or their components, according to exemplary embodiments of the disclosure. In particular, distances and size relations are not reproduced true-to-scale in the figures. In the various figures, corresponding elements are provided with the same reference numbers.

FIGS. 1 to 5 show measuring apparatuses 1 in which the components, such as emission devices 3, 5, high-frequency generators 37, 39 and reception devices 9, 11 are arranged on two separate integrated circuits 25, 27. All the components may also be provided on a common integrated circuit. This alternative is not represented in the figures.

FIG. 1 represents a functional block diagram of a measuring apparatus 1. The measuring apparatus 1 is an SPAD-ASIC-based distance measuring instrument, in particular a laser distance measuring instrument, and comprises two identical integrated circuits, namely the first ASIC 25 and the second ASIC 27. The photosensitive elements of the detector units 16, 17 are configured as SPADs. In this case, the use of detector unit 16, 17 having a plurality of optionally interconnectable pixels, or photosensitive elements, may be advantageous. Besides the components to be described below, the distance measuring instrument comprises a housing in which an evaluation unit for determining the distance between the measuring instrument and an external target object, the distance of which from the instrument is to be determined, is provided. The housing may additionally comprise an output unit, for example in the form of a display or an acoustic output apparatus.

The two ASICs 25, 27 may be fitted in separate housings, in order to achieve good optical isolation between the measurement radiation 13 and the reference radiation 15.

On a top plane, the SPAD-ASICs 25, 27 respectively contain an emission device 3, 5 and a reception device 9, 11. The first ASIC 25 in this case comprises the first emission device 3 and the first reception device 9, and the second ASIC 27 comprises the second emission device 5 and the second reception device 9. The term “first” refers below to the components of the first ASIC 25, and the term “second” refers to the components of the second ASIC 27.

The first reception device 9 in turn consists of a first detector unit 16 and a first time measurement unit 20. The second reception device 11 consists of a second detector unit 17 and a second time measurement unit 21. The detector units 16, 17 are based on SPADs. The output signal of an SPAD in this case consists of an electrical pulse, which is induced by the absorption of a photon and the pulse edge of which correlates with the time of the detection of the photon.

The time measurement is carried out with the aid of clocked counters, the clock signals of which are generated by a frequency generator, in particular a high-frequency generator 37, 39, which is in turn supplied by an oscillator 41. Simultaneously, the emission or measurement radiation 6 is modulated with the aid of the second emission device 5. Alternatively, as shown for example in FIG. 3, the measurement radiation may be modulated alternately by the first emission device 3 and the second emission device 3.

The ASICs 25, 27 in the exemplary embodiment shown in the figures are synchronized. The synchronization may be carried out by a jointly used oscillator 41. To this end, the ASICs 25, 27 may be connected to the oscillator 41 via a high-frequency synchronization line 49. In this case, the high-frequency synchronization line 49 connects the oscillator 41 to the time measurement units 20, 21 via one or more high-frequency generators 37, 39. The high-frequency synchronization may, in particular, be advantageous in order to compensate for a jitter between the high-frequency generators 37, 39. The high-frequency synchronization may preferably be advantageous when the first and second reception devices 9, 11 are arranged on a common ASIC (not shown in the Figs.).

Alternatively, the synchronization may be carried out with the aid of an intermediate frequency, which is generated on the ASIC 25, 27 itself. Furthermore, the synchronization may be carried out with the aid of a low-frequency synchronization line 48. In this case, the oscillator 41 may be connected directly to the time measurement units 20, 21. Low-frequency synchronization may be advantageous when using two separate ASICs, as shown in FIG. 1.

The first ASIC 25 is used for receiving the measurement radiation 13 scattered back from a target object 7. The second ASIC 27 receives the reference radiation 15 scattered back from a reference target 65 (see FIGS. 5A and 5B) having a known distance. The target object 7 and the reference object 65 are illuminated with the measurement radiation 6 of the laser 43.

By means of a first switch 50 and a second switch 51, each time measurement unit 20, 21 can be supplied either with the signals of the detector unit internal to the chip or with the signals of an external source. In other words, the first time measurement unit 20 may be supplied with the signals of the first detector unit 16, which is arranged on the same first ASIC 25. Furthermore, the signals of the second detector unit 17, which is arranged on the second reception device 11, i.e. external to the chip, may be supplied to the first time measurement unit 20. The ASIC 25 to this end comprises a first input 29 and a first output 31. The second ASIC 27 comprises a second input 33 and a second output 35. The inputs and outputs 29, 31, 33, 35 of the two ASICs 25, 27 are connected to one another via two crossed reception lines 47.

Furthermore, the ASICs 25, 27 are connected to an evaluation unit 59. This may, for example, be integrated on one of the ASICs 25, 27. Alternatively, the evaluation unit 59 may be configured separately from the ASICs 25, 27. The evaluation unit 59 is configured in order to carry out measurements of the time of flight $T_A$, $T_B$, $T_C$, $T_D$ with different combinations of the detector units 16, 17 and the time measurement units 20, 21, and in order to determine time-of-flight differences $\Delta T$ on the basis thereof. With the aid of the time-of-flight differences $\Delta T$, for example, temperature-induced time-of-flight errors of the measuring apparatus 1 may be compensated for.

Figure 2:
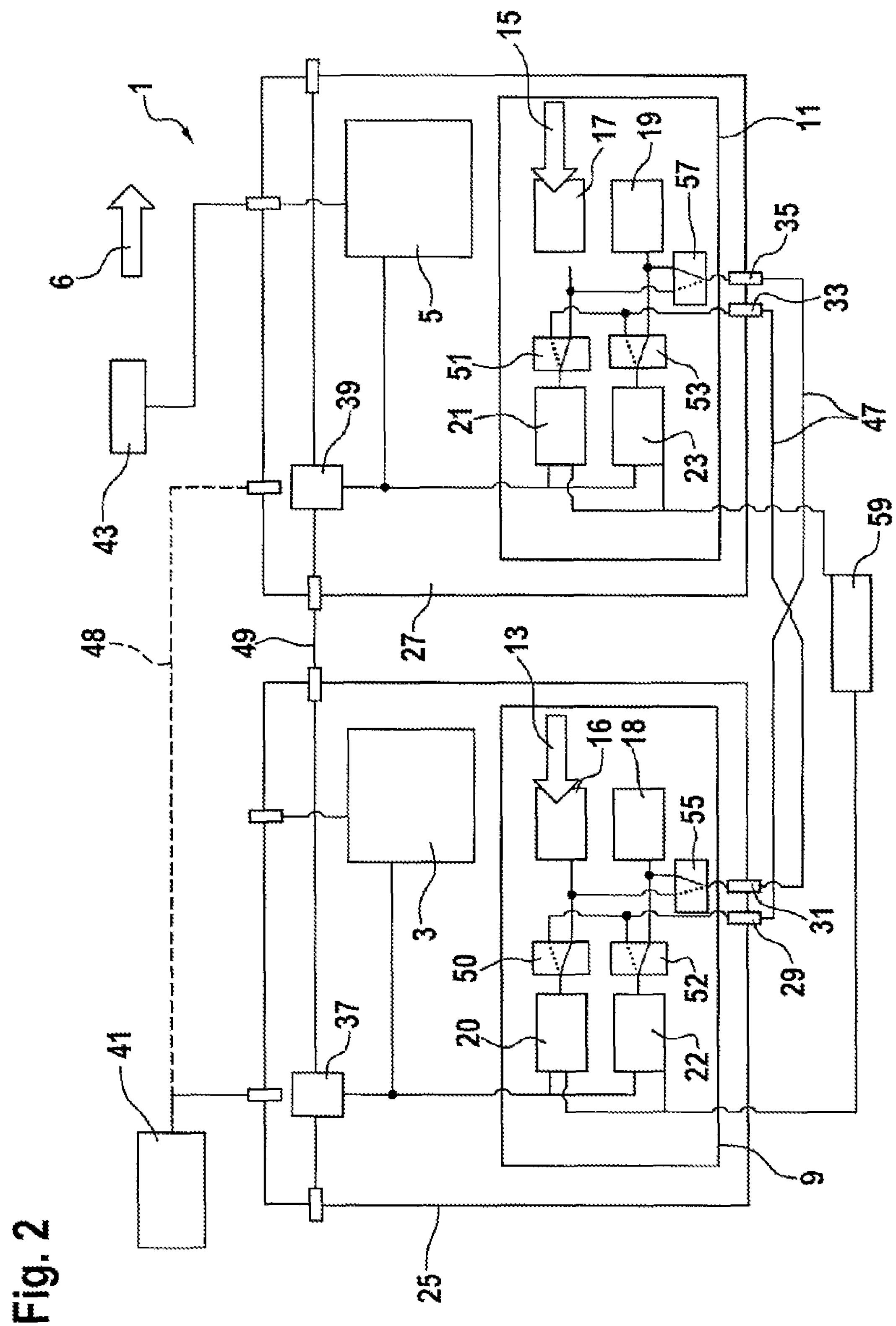
FIG. 2 shows a block diagram of a measuring apparatus according to a second exemplary embodiment of the disclosure.

As shown in FIG. 2, each ASIC 25, 27 may comprise a multiplicity of detector units 16, 17, 18, 19 and a multiplicity of time measurement units 20, 21, 22, 23. Each time measurement unit is assigned at least one detector unit. In this case, in the exemplary embodiment of FIG. 2, a first switch 50 and a third switch 52 are provided on the first ASIC 25, and a second switch 51 and a fourth switch 53 are provided on the second ASIC 27. In addition, the first ASIC 25 comprises a first multiplexer 55 and the second ASIC 27 comprises a second multiplexer 57. With the aid of the first multiplexer 55, for example, it is possible to select a detector unit whose signals are sent to the output of the first ASIC 25. In this way, different combinations of time measurement units and detector units can be connected. The multiplexers 55, 57 in this case render the additional inputs and outputs for the detector units superfluous.

In the exemplary embodiments of FIGS. 1 and 2, the high-frequency generators 37, 39 are synchronized in-phase. Depending on the quality of the synchronization, a jitter may occur between the high-frequency generators 37, 39. This should be kept small as possible, since the modulation of the measurement radiation 6 in the measurements A and D is derived from the emission device of the other respective ASIC. That is to say, during a measurement of the time of flight $T_A$ with the aid of the first detector unit 16 and the first time measurement unit 20, the modulation of the measurement radiation 6 is controlled by the second emission device 5. Likewise, during the measurement of the time of flight $T_D$ by using the first time measurement unit 20 and the second detector unit 17, the modulation of the measurement radiation 6 is controlled by the second emission device 5.

The synchronization between the two high-frequency generators may be carried out on the low-frequency or high-frequency side. High-frequency synchronization may be advantageous with respect to the jitter between the two frequency generators 37, 39.

Figure 3:
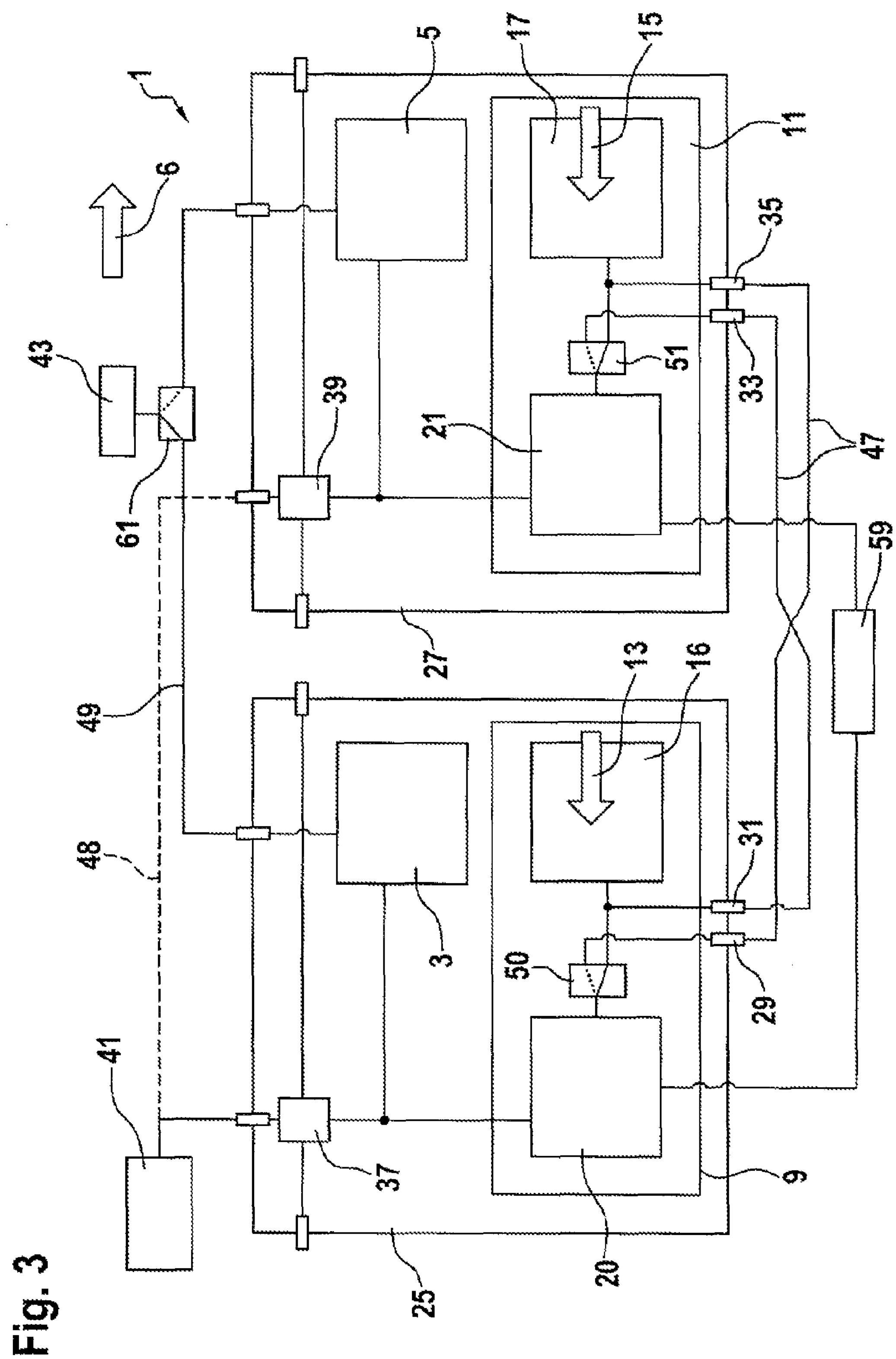
FIG. 3 shows a block diagram of a measuring apparatus according to a third exemplary embodiment of the disclosure.

FIG. 3 represents another exemplary embodiment of the measuring apparatus 1, in which both the reception device and the emission device of the same ASIC can be active simultaneously, so that the influence of the jitter between the high-frequency generators 37, 39 on the measurement can be eliminated. That is to say, the alternative described in the exemplary embodiment in FIG. 3 allows use of the emission device which is derived from the high-frequency generator of the active reception path. On the other hand, the exemplary embodiment also allows use of the emission device which is not derived from the high-frequency generator of the active reception path. In this combination, the influence of the crosstalk from the emission device to the time measurement unit can be eliminated. Two combination possibilities are therefore provided in the exemplary embodiment in FIG. 3. On the one hand the crosstalk, and on the other hand the jitter problem, can be eliminated or compensated for.

This could be achieved by using an additional laser driver switch 61, which is arranged in the driver path between the ASIC 25, 27 and the laser 43. The laser driver switch 61 makes it possible to select the driving ASIC 25, 27, so that the emission devices 3, 5 may also be interchanged during the measurements A and D. The measurements A, B, C and D may in this case be carried out sequentially after one another.

The laser driver switch 61 may also be integrated into one of the ASICs 25, 27, for example by a selectively high-impedance-switchable laser driver output.

Figure 4:
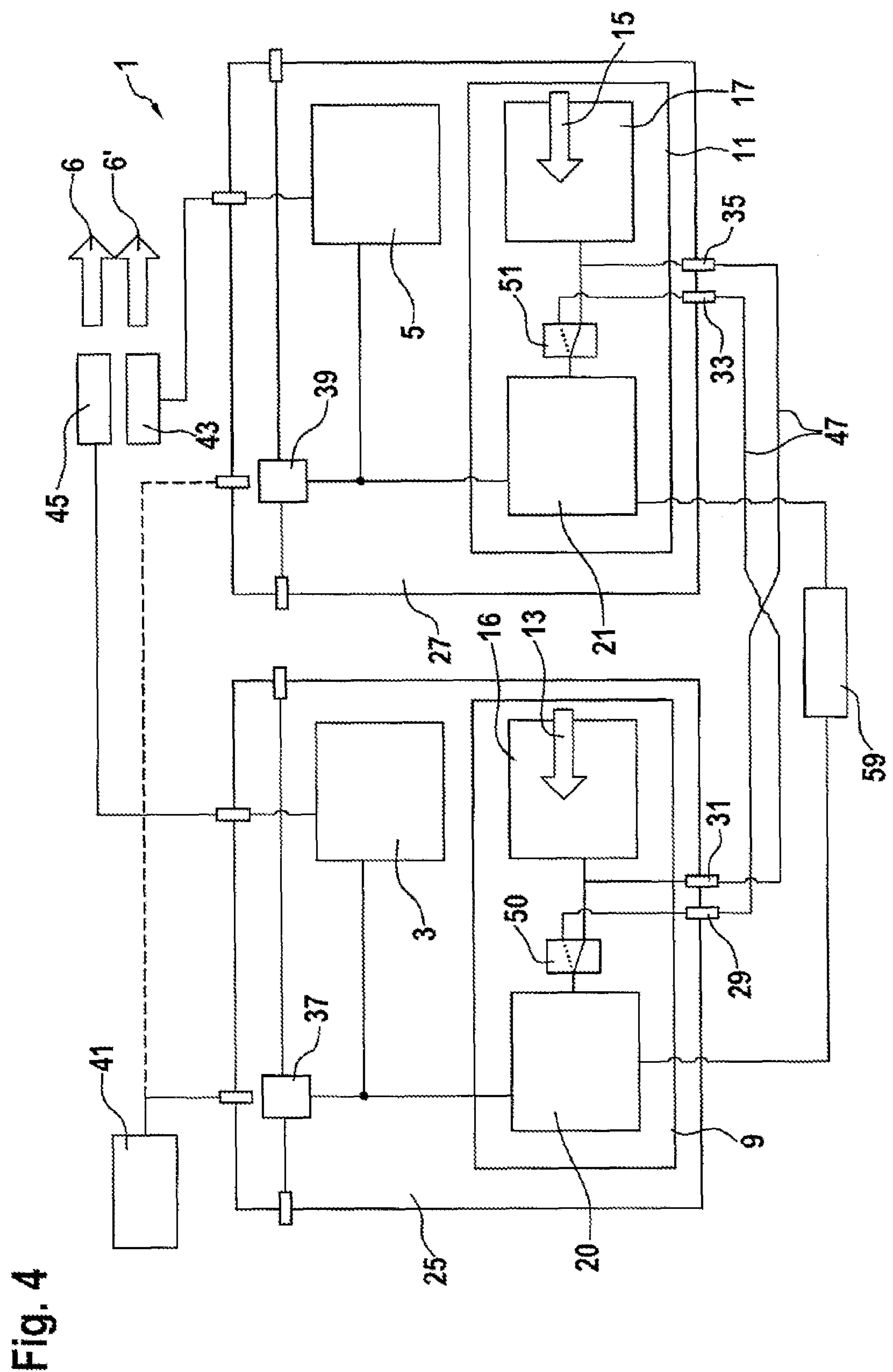
FIG. 4 shows a block diagram of a measuring apparatus according to a fourth exemplary embodiment of the disclosure.

FIG. 4 represents an exemplary embodiment in which the laser driver switch 61 shown in FIG. 3 can be obviated. Instead of the laser driver switch 61, in FIG. 4 a second laser 45 is provided in addition to the first laser 43. The lasers 43, 45 may, for example, be laser diodes in this case. The lasers 43, 45 are adjusted at the same distance from the target object 7 and from the reference target 65. The lasers 43, 45 are in this case preferably operated not simultaneously but successively, so that the measurements A, B, C and D are carried out sequentially.

By the use of two lasers 43, 45, the operation of a single laser with two switchable driver outputs, in particular at high frequencies, can be obviated. It is therefore possible to avoid additional line capacitances having an effect on the transmission characteristic.

Figure 5A:
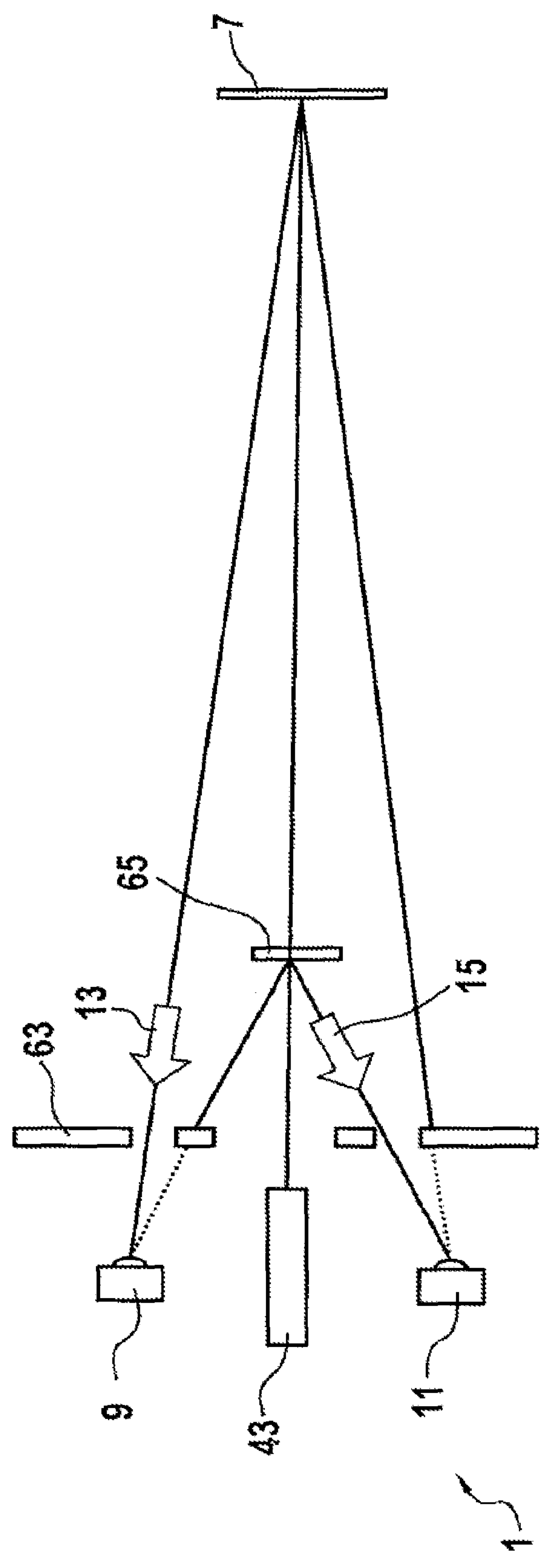
FIG. 5A shows parts of a measuring apparatus, with a slider of the measuring apparatus in a first position, according to a fifth exemplary embodiment of the disclosure.
Figure 5B:
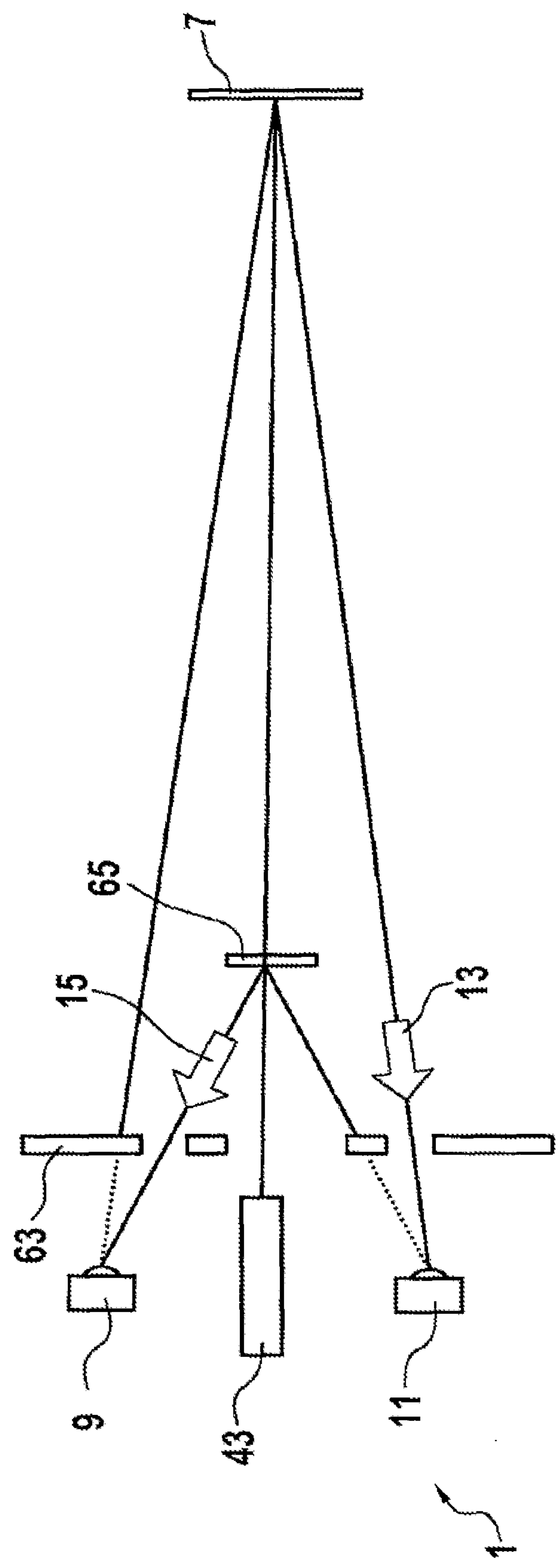
FIG. 5B shows the parts of the measuring apparatus of FIG. 5A with the slider in a second position.

FIGS. 5A and 5B show parts of the measuring apparatus 1, in which a mechanical slider 63 is integrated into the optical path. FIG. 5A shows the slider 63 in a first position and FIG. 5B shows it in a second position. In the exemplary embodiment in FIGS. 5A and 5B, the optical reception paths can be interchanged while preserving the optical time-of-flight differences with respect to the detector units 16, 17. These time-of-flight differences may be denoted as $\tau_{target\_object}$ and $\tau_{reference\_target}$.

In the first position of the slider 63 as shown in FIG. 5A, the radiation 13 scattered back from the target object 7 is directed onto the first detector unit 16 of the first ASIC 25, or the first reception device 9, and the radiation 15 scattered back from the reference target 65 is directed onto the second detector unit 17 of the second ASIC 27, or of the second reception device 11. In the second position of the slider 63 as shown in FIG. 5B, the beam guiding is reversed. That is to say, the radiation 13 scattered back from the target object 7 is directed onto the second detector unit 17 and the radiation 15 scattered back from the reference target 65 is directed onto the first detector unit 16.

The above-described measurements A, B, C, D may in this case be carried out once more for the second slider position as A', B', C', D'. In this case, the differential time-of-flight drifts between the crossed reception lines 47 are also compensated for, as described above, by the additional combination possibilities.

Finally, it should be mentioned that the expressions such as "comprising" or the like are not intended to exclude the possibility that further elements or steps may be provided. Furthermore, it should be pointed out that "one" does not exclude a multiplicity. Furthermore, features described in connection with the various embodiments may be combined with one another in any desired way. It should furthermore be mentioned that the references in the claims are not intended to be interpreted as restricting the scope of the claims.

What is claimed is:

1. A measuring apparatus for optical distance measurement, comprising:
- a first emission device configured to emit an optical measurement radiation onto a target object;
- a first reception device configured to detect radiation returning from the target object and including a first detector unit and a first time measurement unit; and
- a second reception device configured to detect a reference radiation internal to the measuring apparatus and including a second detector unit and a second time measurement unit,
- wherein the first time measurement unit is configured to be connected selectively to the first detector unit and to the second detector unit, and
- wherein the second time measurement unit is configured to be connected selectively to the first detector unit and to the second detector unit.

2. The measuring apparatus according to claim 1, wherein:
- the first detector unit and the second detector unit include SPADs, and
- the SPADs are configured to respectively detect individual photons, which induce an electrical pulse.

3. The measuring apparatus according to claim 2, wherein:
- the first detector unit and the second detector unit are configured to correlate the electrical pulses with a time of the detection of the respective photon and to send this as an input signal to a respective one of the first time measurement unit and the second time measurement unit, and
- the first time measurement unit and the second time measurement unit are configured to convert the input signals into times of flight.

4. The measuring apparatus according to claim 1, further comprising:
- a first multiplexer configured to connect the first time measurement unit selectively to the first detector unit and to the second detector unit.

5. The measuring apparatus according to claim 4, further comprising:
- a second multiplexer configured to connect the second time measurement unit selectively to the first detector unit and to the second detector unit.

6. The measuring apparatus according to claim 1, wherein the first emission device, the first reception device, and the second reception device are integrated in a first integrated circuit.

7. The measuring apparatus according to claim 1, wherein:

the first reception device is integrated in a first integrated circuit, and the second reception device is integrated in a second integrated circuit.

8. The measuring apparatus according to claim 7, wherein the first integrated circuit is configured identically to the second integrated circuit.

9. The measuring apparatus according to claim 8, wherein:

the first integrated circuit includes a first housing, the second integrated circuit includes a second housing, and the first housing is configured separately from the second housing.

10. The measuring apparatus according to claim 1, further comprising:

an oscillator; and a high-frequency synchronization line configured (i) to connect the first time measurement unit to the oscillator, and (ii) to connect the second time measurement unit to the oscillator.

11. The measuring apparatus according to claim 1, further comprising:

an evaluation unit configured (i) to determine a first time of flight by using the first detector unit and the first time measurement unit, and (ii) to determine a second time of flight by using the second detector unit and the second time measurement unit.

12. The measuring apparatus according to claim 11, wherein:

the evaluation unit is further configured (i) to determine a third time of flight by using the first detector unit and the second time measurement unit, and (ii) to determine a fourth time of flight by using the second detector unit and the first time measurement unit.

13. The measuring apparatus according to claim 12, wherein the evaluation unit is further configured to determine the first time of flight and the second time of flight in parallel.

14. The measuring apparatus according to claim 13, wherein the evaluation unit is further configured to determine the third time of flight and the fourth time of flight in parallel.

15. The measuring apparatus according to claim 12, wherein the evaluation unit is further configured to determine a time-of-flight difference by difference formation between the first time of flight, the second time of flight, the third time of flight, and the fourth time of flight.

16. The measuring apparatus according to claim 15, wherein the evaluation unit is further configured to compensate for time-of-flight errors based on the time-of-flight difference.

17. The measuring apparatus according to claim 1, further comprising:

a second emission device; and a laser driver switch configured to connect a laser selectively to the first emission device and the second emission device.

18. The measuring apparatus according to claim 1, further comprising:

a second emission device;

a first laser; and a second laser, wherein the first emission device is configured to operate the first laser when the first time measurement unit is connected to the first detector unit or to the second detector unit, and wherein the second emission device is configured to operate the second laser when the second time measurement unit is connected to the first detector unit or to the second detector unit.

19. The measuring apparatus according to claim 1, further comprising:

a slider configured (i) to direct the reference radiation internal to the apparatus to the first reception device, and (ii) to direct the radiation returning from the target object to the second reception device.

20. A method for compensating for measurement errors of a measuring apparatus, comprising:

determining a first time of flight of radiation returning from a target object by using a first detector unit and a first time measurement unit;

determining a second time of flight of reference radiation internal to the measuring apparatus by using a second detector unit and a second time measurement unit;

determining a third time of flight of the radiation returning from the target object by using the first detector unit and the second time measurement unit;

determining a fourth time of flight of the reference radiation internal to the measuring apparatus by using the second detector unit and the first time measurement unit; and forming differences between the first time of flight, the second time of flight, the third time of flight, and the fourth time of flight in order to compensate for time-of-flight errors using an evaluation unit.

* * * * *